Nov. 2, 1971     J. G. TAKACS     3,616,468
SWIMMING POOL INCLUDING INTEGRAL FILTER
Filed March 26, 1970     3 Sheets-Sheet 3

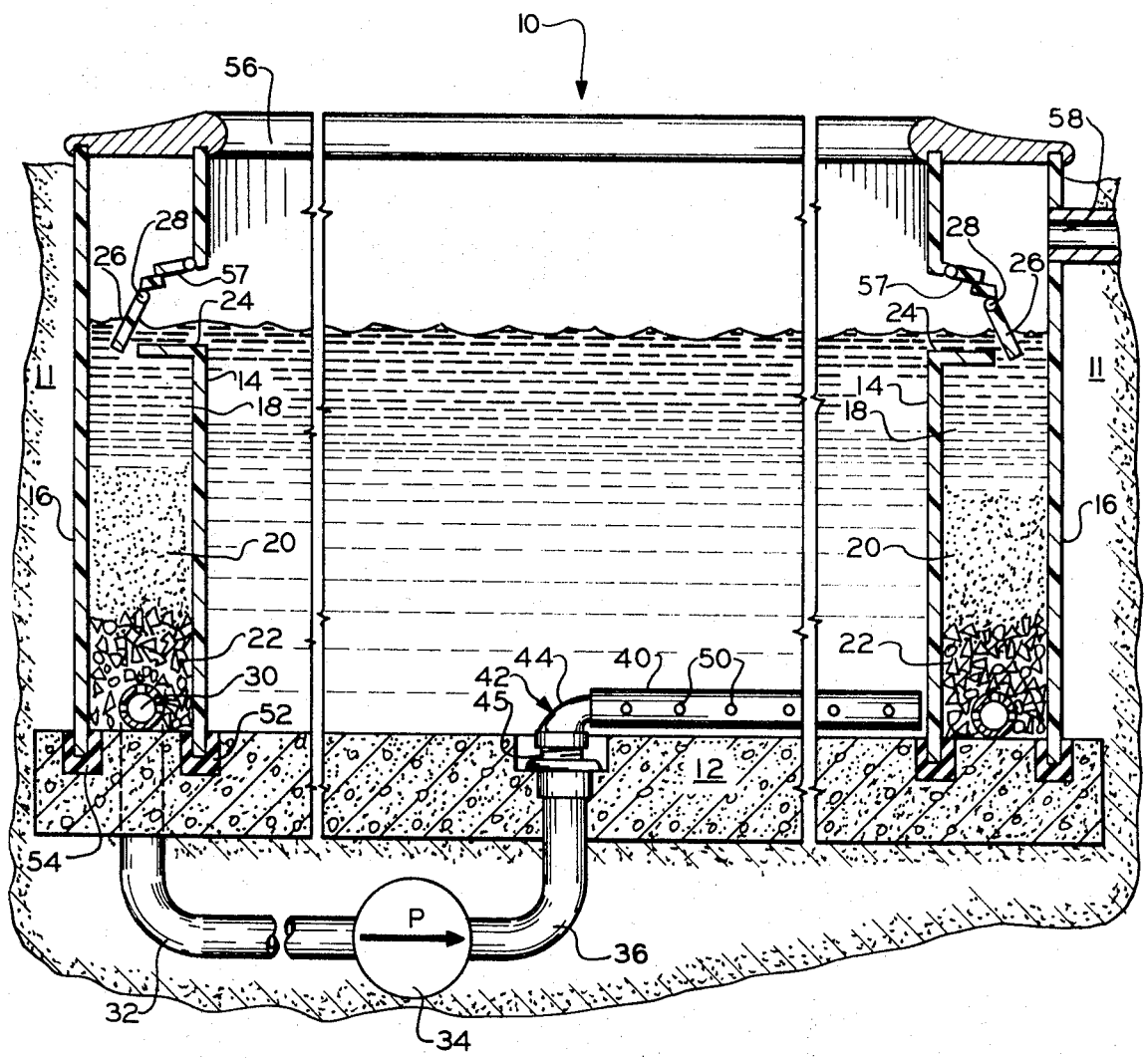
Fig_2

INVENTOR.
JOHN G. TAKACS
BY Samuelson & Jacob
HIS ATTORNEYS

United States Patent Office 3,616,468
Patented Nov. 2, 1971

1

3,616,468
SWIMMING POOL INCLUDING INTEGRAL
FILTER
John G. Takacs, Oakland Drive,
Whitehouse Station, N.J. 08889
Filed Mar. 26, 1970, Ser. No. 22,865
Int. Cl. E04h 3/16, 3/18
U.S. Cl. 4—172.15                                    16 Claims

ABSTRACT OF THE DISCLOSURE

A swimming pool with flexible spaced inner and outer peripheral walls, the space between which is employed as a filter, thereby providing a filter of extremely large capacity. The filter material is preferably of the sand-gravel type, fluent solid material of this type serving to support and reinforce the flexible inner and outer walls. As an optional feature, the filtered water is returned to the main pool volume through a radial tube which is rotatable about a vertical axis at the pool center adjacent the pool bottom. The reaction force of the water discharging sideways from the tube causes the tube to continuously sweep around the pool bottom to prevent debris from collecting on the pool bottom.

BACKGROUND OF THE INVENTION

It is conventional in the prior art to provide a filter to keep the water of a swimming pool clean. However, such prior filters have been quite small compared to the volume of the pool water. Hence, it is necessary to clean them frequently. Examples of prior art swimming pool filter arrangements are shown in the following United States patents: 1,762,366; 2,406,413; 2,902,157; 2,980,256; and 3,173,865.

Additionally, it is known in the prior art to provide swimming pools with a hollow wall construction through which water is conducted, as shown in U.S. Pats. 2,035,835 and 3,319,264 as well as the above-mentioned patents 1,762,366 and 2,406,413.

SUMMARY OF THE INVENTION

In accordance with the present invention, the swimming pool comprises flexible spaced inner and outer peripheral walls. The peripheral space between these walls is employed as the filter. Since this inter-wall space is of considerable volume, there is provided a filter of extremely large capacity which need be cleaned only very infrequently, e.g., once a season.

The filter material itself is a particulate, solid fluent material such as a sand-gravel bed. This bed is confined between the flexible inner and outer walls, and thereby functions as a stiffening means for them.

The filtered water is discharged back into the pool. Preferably, this is done through a tubular pipe which moves across the pool bottom so that all parts of the pool bottom are subjected to an upwardly rising current which will carry with it sediment which has fallen to the bottom. This sediment is then carried to the filter by the water at a higher level being conducted to the filter.

It is therefore an important, general object of the present invention to provide a novel filter for a swimming pool.

It is a further object to provide a filter of extremely large capacity at minimal cost.

2

It is a further object to provide a swimming pool of flexible wall construction wherein the filter reinforces the walls.

It is a further object to return water from the filter to the main pool volume in such a manner that most or all of the bottom portions of the pool are subjected to an upwardly rising current which will carry with it sediment from the pool bottom.

The above and other objects, advantages, and features of the invention will be clear to those of ordinary skill in the art from the following detailed description of a preferred embodiment of the invention when read in connection with the accompanying drawings.

DESCRIPTION OF THE FIGURES

FIG. 2 is an elevational sectional view thereof.

DESCRIPTION OF THE PREFERRED EMBODIMENT

Figure 1:
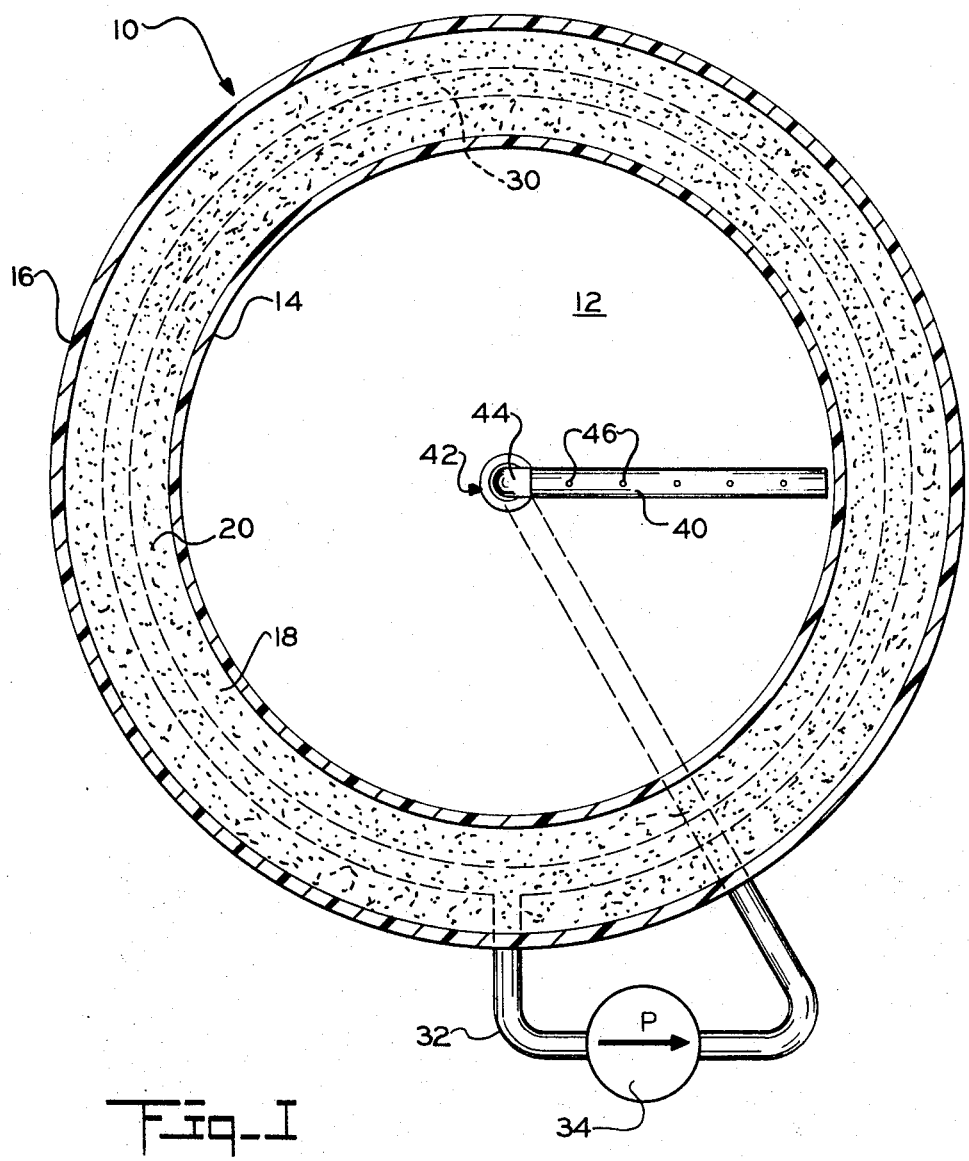
FIG. 1 is top plan view, partially in section, of a below ground pool constructed in accordance with the invention.
Figure 4:
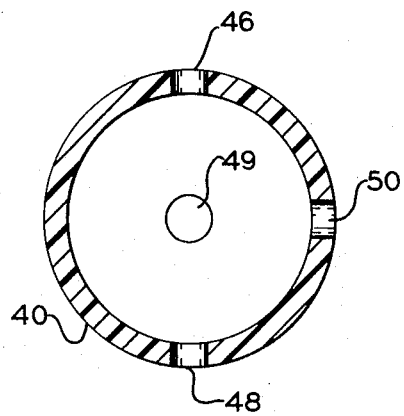
FIG. 4 is a transverse section taken on line 4—4 of FIG. 3.
Figure 3:
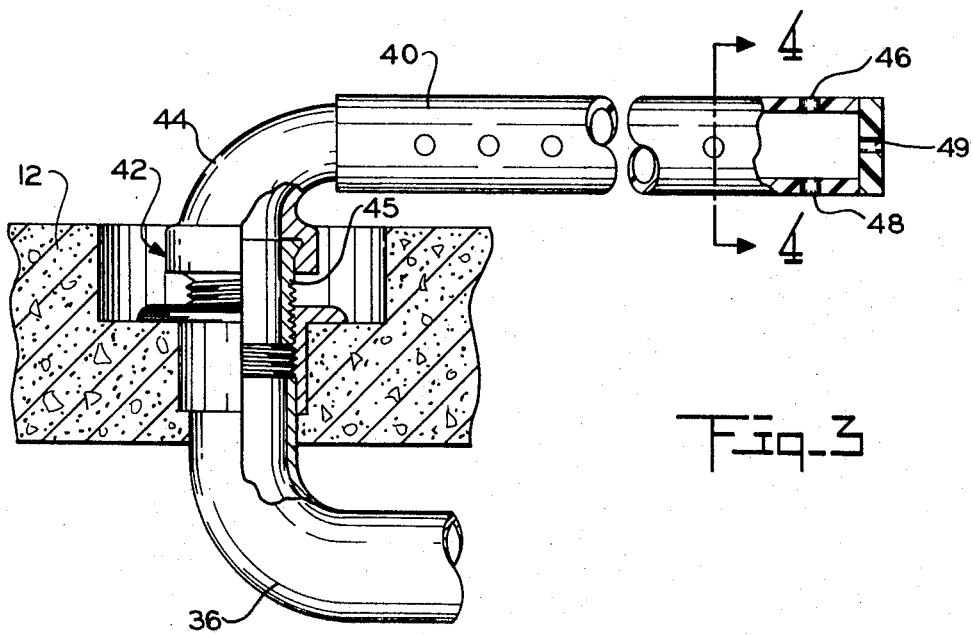
FIG. 3 is an enlarged, fragmentary elevational view, partially in section, of the rotatable discharge tube for returning the filtered water to the main pool volume.

Referring to FIGS. 1 and 2, the reference numeral 10 designates a swimming pool constructed in accordance with the invention. Swimming pool 10 shown and described herein is of the below-ground type, although the principles and features of the invention are equally applicable to above-ground pools. In FIG. 2, the ground is designated by numeral 11.

Pool 10 includes a concrete base 12 and upstanding circumferentially extending inner and outer side walls 14 and 16. Walls 12 and 14 are preferably made of flexible sheet material, such as relatively thin glass filter reinforced polyester resin material (or other plastic) or metal, which may be corrugated for extra strength, and is ordinarily available in roll form.

Inner wall 14 defines the main water-containing volume of the pool. The two walls are laterally spaced throughout their entire length to define therebetween a continuous circumferentially extending space 18 in which is disposed the filter means for the pool. The filter means is preferably a particulate, fluent solid material, such as an upper bed of sand 20, resting on a lower bed of gravel 22. This sand-gravel filter extends completely about the periphery of the pool between walls 14 and 16 in filter space 18, thereby providing a filter of considerable volume. The filter material rests against and is confined by flexible walls 14 and 16, and serves to reinforce and stiffen the walls.

Water from the main pool volume enters the filter space by spilling over through ports 24 spaced about the upper portion of inner wall 14. Each port 24 is provided with a check valve plate 26 hinged at 28 to permit the pool water to flow into the filter space 18, but which will prevent back flow of water from the filter space into the main pool volume.

The water in the filter space 18 travels by gravity down through the filter bed 20, 22, and is thereby cleaned. At the bottom of the filter the cleaned water enters a perforated collector pipe 30 which extends circumferentially about the entire filter bed beneath the gravel layer 22.

From collector pipe 30, the filtered water is fed through pipe 32 to a pump 34 which discharges the water back into the main pool volume through pipe 36. Pump 34 is reversible for backwashing water through the filter to clean the latter, as will be described later.

If desired, the return filtered water could be discharged directly into the bottom of the pool at a fixed point, where the return pipe comes up through the concrete base. However, as an additional optional feature of my invention, I provide means whereby the return water is distributed in an upward direction successively to all portions of the main pool volume, so as to keep dirt particles in the pool suspended at the upper levels of the water rather than settling out on the bottom. Hence, the direct particles will be more likely to be discharged out through the ports 24 and removed in the filter.

For the foregoing purpose, there is provided at the bottom of the pool a radially extending lightweight flexible pipe or tube 40 connected by a coupling 42 to the return pipe 36.

The coupling includes an elbow 44 loosely rotatably mounted on a nipple 45, so that tube 40 can rotate in a horizontal plane about the vertical axis defined by nipple 45.

The discharge tube 40 has top and bottom rows of discharge openings 46 and 48, respectively, an end discharge opening 49, and a third row of discharge openings 50 along only one side thereof. The return water passing through the bottom openings 48 will tend to scour off any sediment settled on the pool bottom, but will also result in an upwardly directed reaction force which would cause the flexible tube to rise. However, this is counterbalanced by the water discharged upwardly through the top openings 46. The water discharged through the side openings 50 results in an oppositely directed reaction force which causes the tube 46 to continuously rotate around the pool bottom so long as pump 34 is operated.

Return water discharged through end opening 49 will tend to scour the vicinity of the intersection of inner side wall 14 and the pool bottom.

The water discharged through all three rows of openings, as well as the end opening, causes a rising current which will carry the sediment particles upwardly to the top of the pool, where they will be discharged to the filter through ports 24. Since tube 40 is continuously rotating, all parts of the pool will be so treated.

To prevent unintended seepage of water into or out of the filter space 18, the entire bottom edges of inner and outer walls 14 and 16 are tightly seated in channel shaped sealing rings 52 and 54 of the pool base 12. Rings 52 and 54 are preferably made of rubber or other elastomeric material.

A top coping 56 holds the upper edges of the inner and outer walls 14 and 16 together, and also closes off the filter space 18.

It will be seen from the foregoing that the present invention provides a swimming pool having a filter of extraordinarily large capacity without any increase or only a trivial increase, in the overall size of the installation. This is achieved by making use of the peripheral space between the pool inner and outer walls as the filter space. A filter of this very large capacity need be cleaned only very infrequently. When it is necessary to clean the filter, all that need be done is to backwash the filter by reversing the direction of operation of pump 34. Water will then be driven from the main pool volume through tube 40, pipe 36, pump 34, pipe 32, collector pipe 30, and then up through the filter, removing from the filter the dirt accumulated therein. The swinging check valve plates 26 will prevent the backwash water from reentering the main pool volume through ports 24. Instead, this water and the accompanying filter debris will be discharged through drain 58, which is at a higher level than ports 24, and then fed to any suitable receiving means.

In order to prevent the pool from overflowing as a result of rain or overfilling, check valves 57 are provided for enabling such excess water to escape through drain 58.

While the pool herein has been shown as circular in shape, it can be of any desired configuration. In fact, the present construction facilitates this, since the filter bed lying between the inner and outer walls supports and reinforces these walls, permitting relatively flexible material to be used for the walls.

The invention and its various features and principles can be practiced in many variant forms. Accordingly, it is intended that the foregoing disclosure of one specific embodiment of the invention be illustrative only and not in any way limitative of the following claims.

The embodiments of the invention in which an exclusive property or privilege is claimed are defined as follows:

1. A swimming pool comprising:
    a peripheral inner wall defining a main pool volume;
    a peripheral outer wall;
    said walls being spaced from one another to define therebetween a filter space extending peripherally about substantially all of said inner wall;
    filter bed means in said filter space and occupying substantially the entire peripheral extent of said filter space;
    and means for conducting fluid between said filter bed means and said swimming pool volume.

2. The combination according to claim 1 wherein said filter bed means is held in place by said inner and outer walls.

3. The combination according to claim 2 wherein said filter bed means comprises fluent solid particulate material resting against said inner and outer walls.

4. The combination according to claim 1 wherein said fluid conducting means comprises passageway means for conducting water from the upper level of said swimming pool volume into said filter space to discharge into said filter bed means.

5. The combination according to claim 4 wherein said passageway means comprises overflow port means provided in said inner wall.

6. The combination according to claim 4 including a check valve means for preventing back flow of water through said passageway means from said filter space to said main pool volume.

7. The combination according to claim 4 including means for returning water which has passed through said filter bed means to said main swimming pool volume.

8. The combination according to claim 7 including collector pipe means underlying said filter bed means for receiving water from said filter bed means;
    further pipe means for conducting water from said collector pipe means back to said main pool volume; and
    pump means for pumping said water through said further pipe means.

9. The combination according to claim 8 wherein said further pipe means includes means for discharging said water at different radially and circumferentially located points along the bottom of said main pool volume.

10. The combination according to claim 9 wherein said last-mentioned discharging means comprises a return discharge tube mounted for movement along said pool bottom.

11. The combination according to claim 10 wherein said movement comprises rotation about a substantially vertical axis.

12. The combination according to claim 11 wherein said return discharge tube is provided with radially disposed row of discharge apertures arranged so that the reaction forces of the water passing through said apertures imparts a rotary torque to said return discharge tube to cause rotation of said tube about said substantially vertical axis.

13. The combination according to claim 8 wherein:
    said pump means comprises a reversible pump, whereby said filter can be backwashed by reversing said pump to pump water from said main pool volume up through said filter bed means; and including means for discharging said backwash water to a location other than said main pool volume after the backwash water has passed through said filter bed means.

14. The combination according to claim 13 wherein said means for discharging said backwash water comprises discharge passageway means leading from said filter space.

15. A swimming pool comprising:
means defining a main pool volume;
filter means for said pool;
means for returning water from said filter means to said main pool volume;
said returning means including a return discharge tube mounted for rotational movement adjacent the bottom of said main swimming pool volume for discharging said water at different radially and circumferentially located points along the bottom of said main pool volume.

16. The combination according to claim 15 wherein said movement comprises rotation about a substantially vertical axis.

References Cited

UNITED STATES PATENTS

| | | | |
|---|---|---|---|
| 1,144,327 | 6/1915 | Grath | 4—172 UX |
| 2,406,413 | 8/1946 | Test | 4—172.18 X |
| 3,306,448 | 2/1967 | Baker | 4—172.17 UX |
| 3,319,264 | 5/1967 | Scarano | 4—172.17 UX |
| 3,386,107 | 6/1968 | Whitten, Jr. | 4—172 |

FOREIGN PATENTS

| | | | |
|---|---|---|---|
| 50,430 | 11/1909 | Switzerland | 4—172.17 |
| 106,921 | 3/1939 | Australia | 4—172.21 |

HENRY K. ARTIS, Primary Examiner

U.S. Cl. X.R.

210—169

UNITED STATES PATENT OFFICE
CERTIFICATE OF CORRECTION

Patent No. 3,616,468　　　　　　　　Dated November 2, 1971

Inventor(s) JOHN G. TAKACS

It is certified that error appears in the above-identified patent and that said Letters Patent are hereby corrected as shown below:

Column 2, line 16, "is top" should read --is a top--;
Column 2, line 36, "12 and 14" should read --14 and 16--;
Column 2, line 37, "filter" should read --fiber--;
Column 3, line 12, "direct" should read --dirt--.

Signed and sealed this 25th day of April 1972.

(SEAL)
Attest:

EDWARD M. FLETCHER, JR.　　　　　　ROBERT GOTTSCHALK
Attesting Officer　　　　　　　　　　Commissioner of Patents

UNITED STATES PATENT OFFICE
CERTIFICATE OF CORRECTION

Patent No. 3,616,468     Dated November 2, 1971

Inventor(s) John G. Takacs

It is certified that error appears in the above-identified patent and that said Letters Patent are hereby corrected as shown below:

The cover sheet of the original grant should be shown as a utility patent, instead of a design patent.

Signed and sealed this 19th day of December 1972.

(SEAL)
Attest:

EDWARD M. FLETCHER, JR.　　　　　　　ROBERT GOTTSCHALK
Attesting Officer　　　　　　　　　　Commissioner of Patents